Nov. 22, 1960 R. B. THORNESS 2,961,194
BALLOON AND METHOD OF MAKING THE SAME
Filed June 24, 1957 2 Sheets-Sheet 2
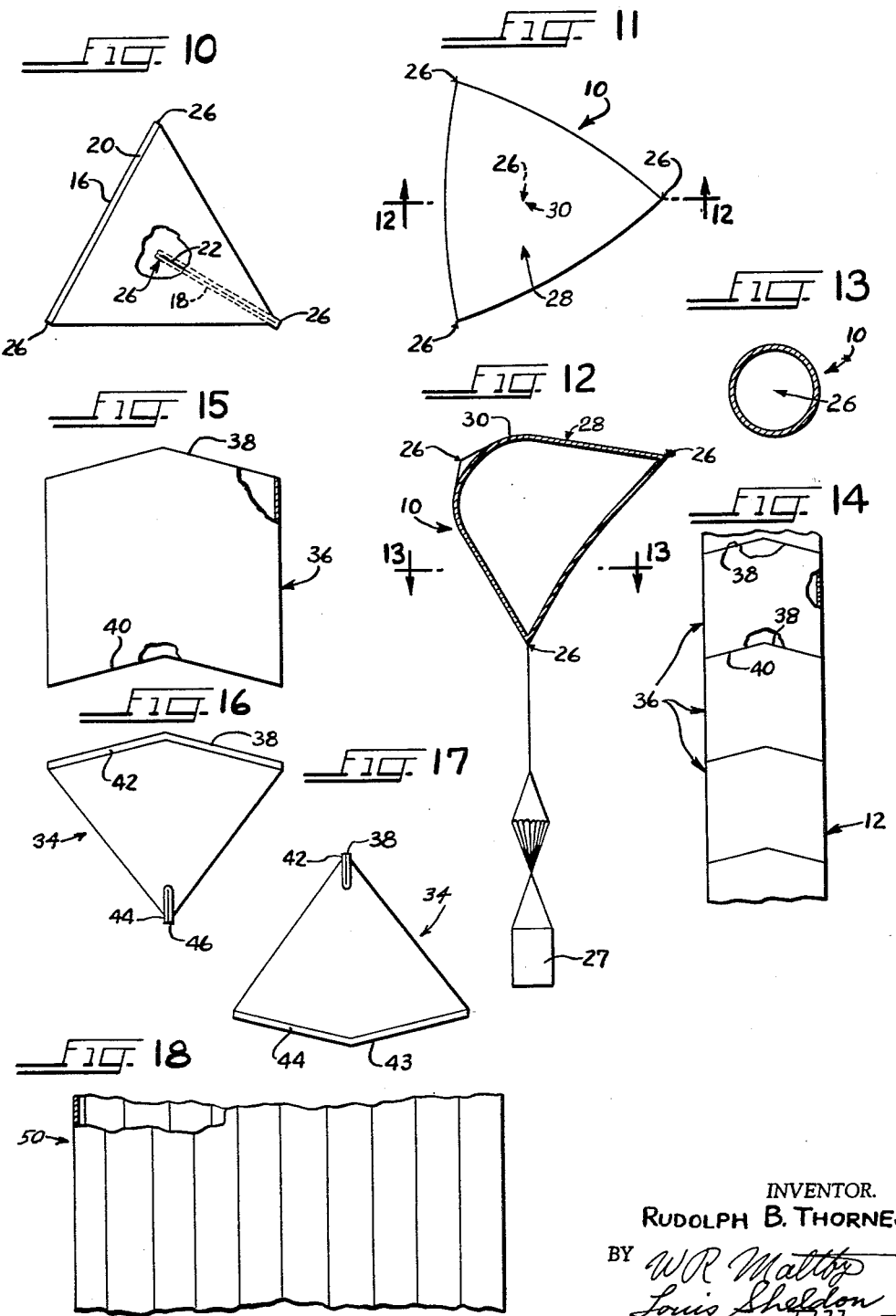
INVENTOR.
RUDOLPH B. THORNESS United States Patent Office 2,961,194
Patented Nov. 22, 1960

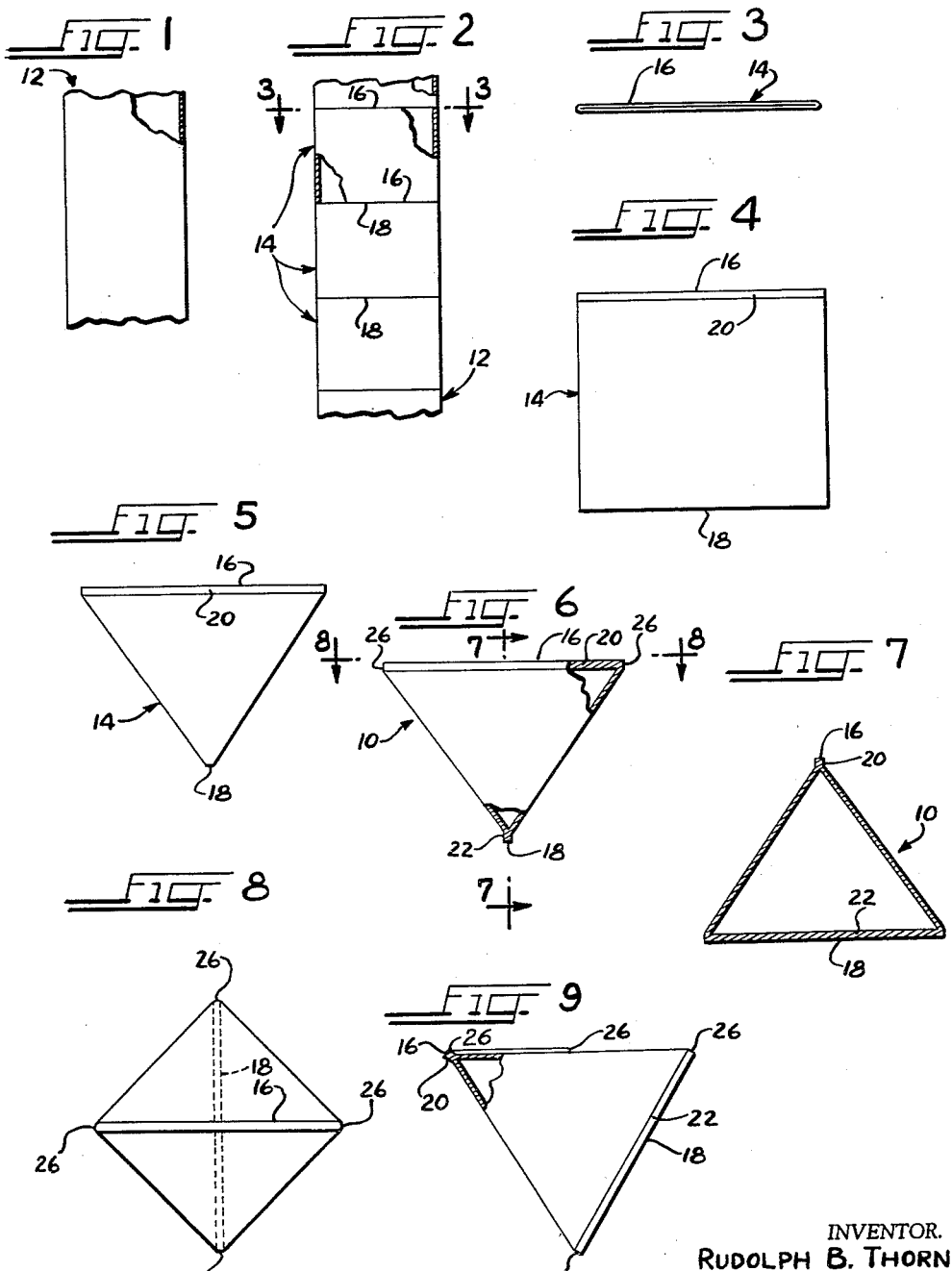

2,961,194

BALLOON AND METHOD OF MAKING THE SAME

Rudolph B. Thorness, Minneapolis, Minn., assignor, by mesne assignments, to the United States of America as represented by the Secretary of the Navy Filed June 24, 1957, Ser. No. 667,728

1 Claim. (Cl. 244—31)

This invention relates to balloons and their manufacture.

A type of balloon which has been in use is the so-called pillow balloon, deriving its name from its shape. The pillow-balloon is formed of a tube of film such as polyethylene flattened to a square and sealed at its ends. The load is suspended from a point (corner) of the inflated balloon, so that the balloon has a pointed top, which is undesirable aerodynamically as well as structurally.

It is an object of the invention to provide an inexpensive balloon having substantial aerodynamic and structural advantages over the pillow balloon.

Another object is to provide an inexpensive balloon having a substantially greater volume-to-weight ratio than the pillow balloon.

An additional object is to provide a balloon akin to but of substantially greater strength than the pillow balloon.

A further object is to provide a balloon simulating the shape of a spherical regular tetrahedron when fully inflated.

Another object is to provide, from a tube, a balloon of generally tetrahedral form.

It is also an object to provide an inexpensive and simple method of making a balloon having one or more of the foregoing advantages.

Further objects and advantages of the invention will appear as the description proceeds.

The invention will be better understood on reference to the following description and the accompanying drawings, wherein Fig. 1 shows, partly in section, a piece of tubing from which sections may be sliced for the production of balloons in accordance with one form of the invention.

Fig. 2 shows the tube of Fig. 1 after it is sliced.

Fig. 3 is an end view, on a larger scale, of a flattened tube section from which a balloon may be made in accordance with the invention.

Fig. 4 shows a tube section with an end sealed.

Fig. 5 is similar to Fig. 4 but shows the other end skewed 90° to the first end, preparatory to sealing of the other end.

Fig. 6 is similar to Fig. 5 but shows the other end sealed.

Fig. 7 is a sectional view taken at 7—7 in Fig. 6.

Fig. 8 is a top plan view taken at 8—8 in Fig. 6.

Fig. 9, partly in elevation and partly in section, shows the balloon formation of Figs. 6 to 8 but so oriented that a corner is lowermost.

Fig. 10 is a top plan view of Fig. 9.

Fig. 11 is a bottom plan view of the balloon as it appears when superpressured in flight.

Fig. 12 is a balloon flight wherein the balloon is shown in a section taken at 12—12 in Fig. 11.

Fig. 13 is a sectional view taken at 13—13 in Fig. 12.

Fig. 14 is similar to Fig. 2 but shows a modified shape of slicing of the tubing of Fig. 1 for the production of a modified balloon.

Fig. 15 shows a tube section formed by the slicing shape shown in Fig. 14.

Fig. 16 shows the tube section of Fig. 15 with one end sealed and the other end skewed and sealed in a plane 90° to the plane of the first end.

Fig. 17 is a side elevational view of Fig. 16.

Fig. 18 shows tubing formed in any desired diameter from rectangular panels sealed together, for making, in accordance with the invention, larger balloons than can be made with seamless balloon film tubing presently available.

Referring now more particularly to the drawings, disclosing illustrative embodiments of the invention, one embodiment is shown at 10, made as follows (Figs. 1 to 13). Tubing 12 of suitable balloon film, such as polyethylene or Mylar, may be extruded or otherwise formed, and, preferably while in flattened condition, is sheared or sliced across at regular intervals, forming a series of tube sections 14 with open ends 16 and 18 (Figs. 1 to 3). The two plies constituting one end, for example the end 16, of each section 14 are heat-sealed or otherwise suitably secured together at the margin 20 (Fig. 4) to close that end along a line normal to the axis of the section. The two plies constituting the other end 18 of the same section 14 are then placed together, without twisting the tube, but so as to extend 90° to the end 16 (Fig. 5) and normal to the axis of the section, and are similarly secured together at the margin 22 (Fig. 6) to close the end 18. As an opening should be provided for inflation, the sealing of one end may be stopped just short of a terminal of that end; or, the balloon may be cut at such a terminal to afford such an opening. After inflation, the opening may be left unsealed if the balloon is to be of the open appendix type, or the opening may be sealed off.

A spherical balloon has a maximum volume-to-weight ratio and thus can carry a maximum load per unit weight of balloon. It is therefore desirable to approach sphericity as nearly as possible, other things being equal. The balloon 10 has four corners 26 and may be said to simulate a tetrahedron, although in fact when the balloon is fully inflated it has four corners (Figs. 8 and 10) and between the corners it is curved throughout (Figs. 11 to 13). To achieve a large volume-to-weight ratio, the balloons 10 is so designed that each corner 26 is equidistant from the other three corners 26. This is accomplished by making the section 14 of an axial length which is 0.866 times the flat width, or 1.36 times the diameter, of the tube (plus a short additional length for the end seams 20 and 22).

The balloon 10, when superpressured, is billowed out and assumes a shape which approaches sphericity, as indicated in Figs. 11 to 13, the corners being the apices of 60° cones which at their bases merge with the intervening generally spheroidal portions. For the same weights of balloon film, and with the same amount of lift gas, and other things being equal, the balloon 10 has at least 7% more volume than a pillow balloon.

The maximum stress in a balloon in flight is exerted at the summit by the lift gas. A corner of the pillow balloon in flight is lowermost, where the load is suspended. Another corner is at the summit of the balloon, and, unless strongly reinforced, is subject to failure at very high altitudes. The balloon 10 is arranged with one of its corners 26 lowermost, where the load 27 is suspended, but, instead of being pointed at the top, presents at the top a spheroidal face or crown 28 (Figs. 11 and 12), the nearest corners 26 being substantially below the summit 30 of the crown and being located adjacent the periphery of the crown, where the stress is relatively small. Thus the balloon 10 requires no summit reinforcement.

In the balloon 10, the seams 20 and 22 are straight and normal to the axis of the tube section 14. Referring now to Figs. 14 to 17, a modified balloon 34 may be made by slicing the tubing 12 with blunt convex cuts at regular intervals to produce tube sections 36, each section being peaked at one end 38 and correspondingly notched at the other end 40, sealing the end 38 to provide a convex margin 42, opening the other end and so reclosing it as to define a plane oriented 90° to the plane of the margin 42, so that the notch is transformed into a peak 43, and sealing its margin 44. Weight for weight the balloon 34 is capable of somewhat greater volume than the balloon 10. As the slicing and sealing cost is somewhat greater for a balloon 34 than for a balloon 10, the balloon 34 does not offer sufficient advantage unless a marginally greater altitude or load carrying capacity becomes particularly desirable. Instead of the V-shaped cuts shown, arc-shaped slicing may be resorted to, to obtain an even greater volume-to-weight ratio, although here again any additional expense of manufacture may have to be taken into consideration.

The diameter of tubing which can be economically extruded is limited, the present maximum diameter being about eight feet. For many high altitude flight purposes, balloons of considerably greater diameter, having volumes approaching or exceeding a million cubic feet, are required. Some such balloons are made using specially shaped gores, intermediately wide and tapering endwise, and sealed at their longitudinal edges, the resulting balloon when fully inflated being substantially semi-spherical at the top and conical downward therefrom. This is a very expensive type of balloon, calling for painstaking effort in, among other things, cutting the gores to proper shape, bringing together the margins to be sealed, and sealing them.

Another type of large-diameter balloon is the so-called cylinder balloon, made with a number of rectangular gores or panels sealed at their longitudinal margins to form a tube 50 (Fig. 18) and gathered together at top and bottom. Properly dimensioned, such a balloon when fully inflated approaches sphericity. However, due to the gathering of the film at top and bottom, this type of balloon has a relatively low volume-to-weight ratio, on the order of one-half what is achieved by balloons according to this invention.

For such large diameter balloons made in accordance with the invention, the tubing used is formed of rectangular panels as noted above. However, instead of being gathered, the ends of the section are cut and sealed in any of the ways herein disclosed.

In the drawings the thickness of the film material and the width of the seams are exaggerated. In several of the figures the balloon is shown in the form of a tetrahedron for the sake of a clear understanding of the invention although, as noted, when the balloon is superpressured, the balloon is billowed out substantially as shown and described.

While preferred embodiments have been described in some detail they should be regarded as examples of the invention and not as restrictions or limitations thereof as changes may be made in the construction and arrangement of the parts without departing from the spirit and scope of the invention.

I claim:

A high altitude balloon comprising an inelastic plastic balloon film tube, said tube having an axial length which is 87% of its flat width, the tube being seamed on itself at each end to provide a closed envelope with four apices, the straight line defined by the two apices at one end being 90° to the straight line defined by the two apices at the other end, the lines being normal to the tube axis, so that, when the envelope is fully inflated, each apex is substantially equidistant from the other three.

References Cited in the file of this patent

UNITED STATES PATENTS

| 23,163 | Gage | Mar. 8, 1859 |
| 969,732 | Tebyrica | Sept. 6, 1910 |
| 1,445,878 | Faber | Feb. 20, 1923 |
| 2,341,056 | Moore | Feb. 8, 1944 |
| 2,666,600 | Huch et al. | Jan. 19, 1954 |

FOREIGN PATENTS

| 187,035 | Austria | Oct. 10, 1956 |